United States Patent [19]

Matsuda et al.

[11] Patent Number: 4,604,549
[45] Date of Patent: Aug. 5, 1986

[54] ORANGE-YELLOW EMITTING PHOSPHOR AND CATHODE-RAY TUBE EMPLOYING THE SAME

[75] Inventors: Naotoshi Matsuda, Kawasaki; Masaaki Tamatani, Fujisawa, both of Japan

[73] Assignee: Tokyo Shibaura Denki Kabushiki Kaisha, Kawasaki, Japan

[21] Appl. No.: 767,076

[22] Filed: Aug. 19, 1985

Related U.S. Application Data

[63] Continuation of Ser. No. 557,882, Dec. 5, 1983, abandoned.

[30] Foreign Application Priority Data

Dec. 7, 1982 [JP] Japan ................................ 57-213308

[51] Int. Cl.$^4$ ............................................. C09K 11/477
[52] U.S. Cl. ............................... 313/468; 252/301.4 R
[58] Field of Search .................. 252/301.4 R; 313/468

[56] References Cited

U.S. PATENT DOCUMENTS 3,394,084  7/1968  Avella ............................... 252/301.4
4,005,328  1/1977  Radielovic et al. ...... 252/301.4 R X

FOREIGN PATENT DOCUMENTS 46-31843  9/1971  Japan ............................ 252/301.4 R
495706  11/1938  United Kingdom .

OTHER PUBLICATIONS

Patent Abstracts of Japan, Unexamined Applications, C Field, vol. 6, No. 127, Jul. 13, 1982.
F. J. Avella et al., "Rare Earth Cathodoluminescence in InBO$_3$ and Related Orthoborates", J. Electrochem. Soc., 114, 613 (1967).
O. H. Schade, "Electro-Optical Characteristics of Television Systems," RCA Review 9, 245 (1945).
F. J. Avella, "The Cathodoluminescence of Terbium Activated Indium Orthoborate," J. Electrochem. Soc., 113, 1225 (1966).

*Primary Examiner*—Jack Cooper
*Attorney, Agent, or Firm*—Schwartz, Jeffery, Schwaab, Mack, Blumenthal & Evans

[57] ABSTRACT

Disclosed is an orange to yellow emitting phosphor, comprising an europium and terbium co-activated indium borate represented by the chemical compositional formula:

$$(In_{1-a-b}Eu_aTb_b)BO_3$$

wherein a and b are $0.0001 \leq a \leq 0.04$, $0.0001 \leq b \leq 0.04$.

11 Claims, 3 Drawing Figures

ORANGE-YELLOW EMITTING PHOSPHOR AND CATHODE-RAY TUBE EMPLOYING THE SAME

This application is a continuation, of application Ser. No. 557,882, filed Dec. 5, 1983, now abandoned.

BACKGROUND OF THE INVENTION

This invention relates to an orange to yellow emitting phosphor. More particularly, it relates to an orange to yellow emitting phosphor useful for a cathode-ray tube used in office automation equipments, and also to a cathode-ray tube manufactured by employing the phosphor.

As computers and the like have widely been used, various investigations have been made about the display for the cathode-ray tubes employed therefor. As for the displayed color hue, an orange to yellow display is desired for the purpose of preventing fatigue of eyes. Moreover, the fatigue of eyes is known to be caused by flicker phenomenon, whose generation depends on the fluorescence persistence properties and on the electrical excitation modes, even if the color hue may be satisfactory.

The flicker phenomenon will tend to be generated as the number of frames per second (frame frequency) is lower, and therefore displays may be sometimes practically useless in Europe where the frame frequency is lower (50 Hz) than those in Japan and the United States (60 Hz).

One means for resolving the above problem is to elongate the afterglow time of a phosphor. The other means is to make the frame frequency higher. It is disadvantageous to high-frequency display to design an electrical circuit to make the frame frequency higher. It is desirable to use long-persistence (or afterglow) phosphor.

As a phosphor material having the desired emitting characteristics as described above, there is a cadmium containing phosphor as disclosed in British Pat. No. 495,706. This may be represented by the chemical composition of $Cd_5Cl(PO_4)_3$:Mn. The time in which the fluorescent light intensity reaches 1/10 of the initial intensity after cessation of electron excitation (10% afterglow time) is as long as 25 to 30 milliseconds. In this case, even when the frame frequency may be as low as 50 Hz, it is possible to obtain a cathode-ray tube of an orange-emitting display without sensible flicker phenomenon.

In the above case where the frame frequency is about 50 Hz, the flicker phenomenon may sufficiently be alleviated if the 10% afterglow time of a phosphor is in the range from 10 to 100 milliseconds, particularly from 15 to 30 milliseconds. For this reason, the above-mentioned cadmium containing phosphor is practically useful.

However, cadmium contained in the above-mentioned phosphor is harmful to human bodies, involving so vital a defect that its use may sometimes be prohibited. Thus, the above-mentioned phosphor has a substantial problem.

In place of the aforesaid phosphor, as a phosphor emitting orange to yellow fluorescence with high color purity, it is possible to obtain a mixed phosphor wherein two or more kinds of emitting materials; for instance, europium-activated indium borate (red color) and terbium-activated indium borate (green color) disclosed in U.S. Pat. No. 3,394,084 may be candidates for these materials. This mixed phosphor has a specific feature in that its emission color can be freely controlled by choice of the materials to be mixed on the one hand, but on the other hand it also involves the drawback that a constant uniform emission color can be obtained only with great difficulties. That is to say, while it is possible to control the emission colors by varying the mixing ratio of two kinds of emitting materials with different emission colors, it is difficult to obtain a luminescent screen which is uniform in distribution of emission colors over the whole screen of the cathode-ray tube. For example, as shown by a in FIG. 1, different colored emission may occur partially in an edge band on the screen 1 of the cathode-ray tube. This may be prevented considerably, if its manufacturing process is controlled severely, but no complete prevention can be expected.

On the other hand, even if the mixing ratio of red (R) and green (G) of the phosphor particles may be fixed constant as shown in FIG. 2, the emission color obtained is not always constant when the component phosphor lots are changed, because size and fluorescent efficiency of both phosphor particles usually vary from lot to lot.

Further, it is also known to be difficult to obtain a high resolving power. Accordingly, it is impossible to attain the desired object of this invention by a mixed phosphor.

As a substitute for such a mixed phosphor, it has now been thought of to use a Eu and Tb co-activation type phosphor. In this type of phosphor, activators added to respective phosphor particles was expected to maintain sufficiently the emission characteristics of the activators to give an emission of high efficiency. Moreover, it was also expected that the emission color could freely be controlled by the concentrations of the respective activators. However, these expectations failed to come true, because the emission characteristic of the phosphor co-activated with Eu and Tb at concentrations preferable for single activations proved to be greatly different from that expected. That is, the emission color became reddish orange. Moreover, the emission efficiency was found to be lowered to a great extent as compared with the singly activated phosphors.

The present inventors began to carry out further extensive studies about utilization of the advantage of the above-mentioned co-activation and consequently found that the object of this invention could be accomplished only within a limited range of materials and activator concentration.

An object of this invention is to provide an orange-yellow emitting co-activated phosphor which can give a desired emission color between orange and yellow and which does not include a harmful element in its chemical composition, and which can also provide a luminescent screen having excellent color purity, sufficiently long afterglow and high resolution.

This invention will be described in detail below with reference to the accompanying drawings.

SUMMARY OF THE INVENTION

Figure 1:
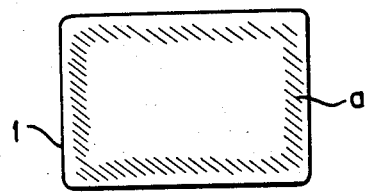
FIG. 1 shows a front view of a cathode-ray tube for illustration of the chromaticity distribution on the luminescent screen of the cathode-ray tube.
Figure 2:
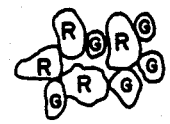
FIG. 2 is an enlarged view of the phosphor particles for explanation of the relation between the phosphor particles and the chromaticity distribution.

This invention provides a phosphor capable of emitting from orange to yellow by varying the amounts of the activating elements incorporated, with a 10% afterglow time being 10 milliseconds or longer, and a cathode-ray tube employing the same. The orange-yellow emitting phosphor comprises an europium and terbium co-activated indium borate represented by the chemical composition formula:

wherein a and b are $0.0001 \leq a \leq 0.04$, $0.0001 \leq b \leq 0.04$.

DESCRIPTION OF THE PREFERRED EMBODIMENTS

The phosphor according to this invention is a co-activated phosphor comprising indium borate capable of emitting an intermediate color (orange-yellow) between the red color which is the emission color due to europium (Eu) and the green color which is the emission color due to terbium (Tb). The fluorescent emission of the co-activated phosphor consists of the emission due to Eu and the emission due to Tb. The fluorescent emission due to Eu has the peak wavelength at around 590 nm in the spectrum and a chromaticity of x=0.61 and y=0.39 on the CIE chromaticity coordinate. The 10% afterglow time is about 15 milliseconds, which is in conformity with one of the purposes of the present invention, namely the prevention of flicker. On the other hand, the emission due to Tb has the peak wavelength at around 550 nm and a chromaticity of x=0.32 and y=0.63 on the CIE chromaticity coordinate. Its 10% afterglow time is as long as 18 milliseconds, thus possessing sufficient characteristics. Further, the phosphor has excellent emission efficiency under electron beam excitation.

The above-mentioned co-activated phosphor cannot hold sufficiently the respective characteristics of the activators as mentioned above, unless the amounts of the activators formulated are restricted within specific ranges. The chemical compositional formula should be:

wherein a and b are $0.0001 \leq a \leq 0.04$, $0.0001 \leq b \leq 0.04$.

If the activators are used in such large quantities that a and b each exceed 0.04, the interaction between Eu and Tb in the phosphor particle matrix will become undesirably too great, resulting in lowering of luminance. With such a phosphor, the object of this invention cannot be achieved. Moreover, the required emission color (orange-yellow) will become unpractically more reddish than is necessary.

On the contrary, when a or b is 0.0001 or less, the phosphor luminance becomes unpractically low.

By controlling the activator quantity ratio of Eu to Tb, a/b, to a value in the range from 0.2 to 10, the object of the present invention can be made more effective. In other words, when a/b is below 0.2 or above 10, the emission color becomes too greenish or too reddish, respectively, outside the range of the emission color from orange to yellow of this invention, as opposed to the object of this invention.

Accordingly, by controlling the amounts of Eu and Tb incorporated into the ranges as specified above, an indium borate phosphor co-activated with Eu and Tb capable of emitting orange to yellow can be obtained.

According to this invention having the constitution as described above, an emission color between orange and yellow can freely be selected by varying the amounts of Eu and Tb incorporated at the ratio in the range as specified above to give good results when applied for a cathode-ray tube for office automation equipments.

For example, the problem of environmental pollution or others can be removed by avoiding the use of cadmium compounds. As for the colors, all the emission colors between orange and yellow reducing fatigue of eyes and suitble for office automation equipments are rendered possible. Further, the 10% afterglow time is about 18 to 23 milliseconds, and the flicker phenomenon can sufficiently be reduced even at a frame frequency number of 50 Hz. More specifically, by co-activation with Tb of an Eu activated indium borate phosphor having a 10% afterglow time of about 15 millisceonds, there was obtained the result that the 10% afterglow time was improved by about 3 to 4 milliseconds. This is a very favorable fact for the present invention in the sense of accomplishing its object, and also it is one of the specific features of the invention.

Furthermore, since individual particles themselves have the same emission color, no undesirable distribution of chromaticity within the luminescent screen will be generated, and reduction in resolution power on the luminescent screen due to coexistence of different color emitting particles will be avoided.

EXAMPLE 1

Proper amount of indium oxide ($In_2O_3$), europium oxide ($Eu_2O_3$) and terbium oxide ($Tb_4O_7$) and a great excess (2 or 3 times larger than stoichiometric amount) of boric acid ($H_3BO_3$) were sufficiently mixed. Then, the mixture was placed in a quartz crucible and fired at 1300° C. (in general, at about 1000° to 1400° C.) in the air for 3 hours (in general, for 1 to 5 hours) to obtain an indium borate phosphor co-activated with europium and terbium having a chemical composition formula of $(In_{1-a-b}Eu_aTb_b)BO_3$ wherein a=0.003 and b=0.001.

Figure 3:
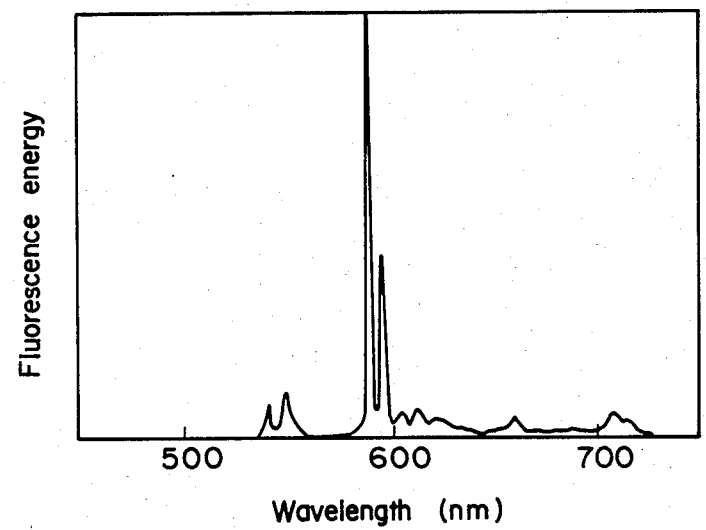
FIG. 3 shows the emission spectrum of a phosphor according to the present invention.

The thus formed Eu, Tb co-activated indium borate phosphor was settled on the internal face of a 14 inch cathode-ray tube, followed by attachment by sealing of an electron gun to prepare a cathode-ray tube for an office computer. The phosphor coated on the luminescent screen of the cathode-ray tube had a chromaticity of x=0.55 and y=0.44 on the CIE chromaticity coordinate, having the peak wavelength at about 589 nm in the emission spectrum as shown in FIG. 3, thus providing an orange color which is high in emission luminance and color purity. The afterglow time was found as long as about 19 milliseconds.

EXAMPLE 2

Various phosphors co-activated with Eu and Tb were prepared according to the same procedure as described above in Example 1 by varying the amounts of the activators. That is, in the above composition formula $(In_{1-a-b}Eu_aTb_b)BO_3$, a and b were varied, to obtain the results as shown in Table 1. Further, for comparison, mixed phosphors comprising indium borate phosphors singly activated with Eu or Tb, and a $Cd_5Cl(PO_4)_3$: Mn phosphor are also shown.

TABLE 1

| | Amounts of activators | | | Chromaticity (CIE) | | Relative luminance | Afterglow time (msec.) | Color distribution (on luminescent screen) | Resolution | Pollution | Color | Overall evaluation |
|---|---|---|---|---|---|---|---|---|---|---|---|---|
| | Eu (a) | Tb (b) | a/b | x | y | | | | | | | |
| Example | | | | | | | | | | | | |
| 1 | 0.003 | 0.001 | 3 | 0.55 | 0.44 | 56 | 19 | uniform | good | free | good | very good |
| 2 | 0.0001 | 0.0001 | 1 | 0.45 | 0.52 | 36 | 17 | " | " | " | " | good |
| 3 | 0.001 | 0.001 | 1 | 0.48 | 0.50 | 75 | 17 | " | " | " | " | very good |
| 4 | 0.01 | 0.01 | 1 | 0.55 | 0.44 | 44 | 18 | " | " | " | " | " |
| 5 | 0.008 | 0.005 | 1.6 | 0.57 | 0.42 | 38 | 23 | " | " | " | " | " |
| 6 | 0.02 | 0.02 | 1 | 0.59 | 0.41 | 24 | 18 | " | " | " | " | good |
| 7 | 0.035 | 0.005 | 7 | 0.60 | 0.40 | 20 | 18 | " | " | " | " | " |
| 8 | 0.01 | 0.03 | 0.33 | 0.45 | 0.53 | 17 | 18 | | " | " | " | " |
| Comparative example | | | | | | | | | | | | |
| 1 | — | 0.04 | | 0.32 | 0.63 | 100 | 18 | — | — | " | bad | bad |
| 2 | 0.02 | 0.02 (mixed) | | 0.43 | 0.54 | 69 | 16 | ununiform | bad | " | good | " |
| 3 | 0.03 | 0.01 (mixed) | | 0.51 | 0.48 | 53 | 16 | " | " | " | good | " |
| 4 | 0.04 | — | | 0.61 | 0.39 | 37 | 15 | — | — | " | passable | " |
| 5 | $Cd_5Cl(PO_4)_3$:Mn | | | 0.56 | 0.44 | 75 | 25-30 | uniform | good | " | bad | good | " |

As is apparent from the above Table 1, Example 2 according to the present invention, in which Eu and Tb have been made minimum and equal, has no problem in practical application. Examples 3 and 4, in which Eu and Tb were increased in amounts, respectively, show higher relative luminance with the persistence characteristic being slightly improved. Example 5, with the ratio between Eu and Tb being a/b=1.6, is excellent in the afterglow characteristic which is as long as 23 milliseconds. In Examples 6, 7 and 8, the relative luminances are relatively lower but the afterglow time is as good as about 18 seconds, and they are also within the practical range. In contrast, in Comparative examples, the sample No. 1 has a green color with a relative luminance of 100 (this is the standard) and it is necessary to mix another phosphor in order to obtain the desired orange color of the invention. In Comparative examples 2 and 3, mixed phosphors are employed and the chromaticity distributions on the luminescent screen are ununiform and also show differences in resolution as compared with the present invention.

We claim:

1. An orange to yellow emitting phosphor, consisting essentially of an europium and terbium co-activated indium borate represented by the formula:

$$(In_{1-a-b}Eu_aTb_b)BO_3$$

wherein a and b are such that $0.0001 \leq a \leq 0.04$ and $0.0001 \leq b \leq 0.04$ and exhibiting a longer 10% afterglow time under electron excitation than a mixture of europium activated indium borate and terbium activated indium borate phosphors having the same quantity of europium and terbium.

2. The phosphor according to claim 1, wherein a and b further have the relationship of $0.2 \leq a/b \leq 10$.

3. The phosphor according to claim 1, wherein a is 0.003 and b is 0.001.

4. The phosphor according to claim 1, wherein a and b each are 0.0001.

5. The phosphor according to claim 1, wherein a and b each are 0.001.

6. The phosphor according to claim 1, wherein a and b each are 0.01.

7. The phosphor according to claim 1, wherein a is 0.008 and b is 0.005.

8. The phosphor according to claim 1, wherein a and b each are 0.02.

9. The phosphor according to claim 1, wherein a is 0.035 and b is 0.005.

10. The phosphor according to claim 1, wherein a is 0.01 and b is 0.03.

11. A cathode ray tube comprising (i) a fluorescent screen which presents a surface facing into said cathode ray tube and (ii) an electron gun distal from, and oriented toward, said surface in said cathode ray tube, said electron gun being sealingly affixed to said cathode ray tube, wherein said surface of said fluorescent screen comprises a phosphor as claimed in claim 1.

* * * * *